United States Patent [19]
Spear et al.

[11] Patent Number: 6,130,883
[45] Date of Patent: Oct. 10, 2000

[54] METHOD AND APPARATUS FOR VOICE PACKET COMMUNICATIONS

[75] Inventors: Stephen Spear, Skokie; Sanjay Gupta, Chicago, both of Ill.

[73] Assignee: Motorola, Inc., Schaumburg, Ill.

[21] Appl. No.: 09/124,946

[22] Filed: Jul. 30, 1998

[51] Int. Cl.[7] ................................................. G01R 31/08
[52] U.S. Cl. ......................... 370/328; 370/466; 455/517
[58] Field of Search .................................. 370/328, 335, 370/349, 338, 352, 356, 342, 379, 401, 465, 466, 467; 455/49.1, 54.1, 509, 507, 517; 340/825.03

[56] References Cited

U.S. PATENT DOCUMENTS

| | | | |
|---|---|---|---|
| 5,533,019 | 7/1996 | Jayapalan | 370/60.1 |
| 5,604,737 | 2/1997 | Iwami et al. | 370/352 |
| 5,726,984 | 3/1998 | Kubler et al. | 370/349 |
| 5,729,544 | 3/1998 | Lev et al. | 370/352 |
| 5,894,478 | 4/1999 | Barzegar et al. | 370/401 |

*Primary Examiner*—Alpus H. Hsu
*Assistant Examiner*—Duc Ho
*Attorney, Agent, or Firm*—Kenneth A. Haas

[57] ABSTRACT

A wireless communication system (100) provides an over the air efficient communication of packet voice information between a mobile station (MS) (101) and a host (112) connected to a data packet switching network (110). Via a wireless link (102), a base station system BSS (118) receives voice channel coded voice information from MS 101, after decoding in BSS (118), adapting a decoded voice information to a data packet switching format, and communicating the decoded voice information to host (112) through data network (101).

24 Claims, 4 Drawing Sheets

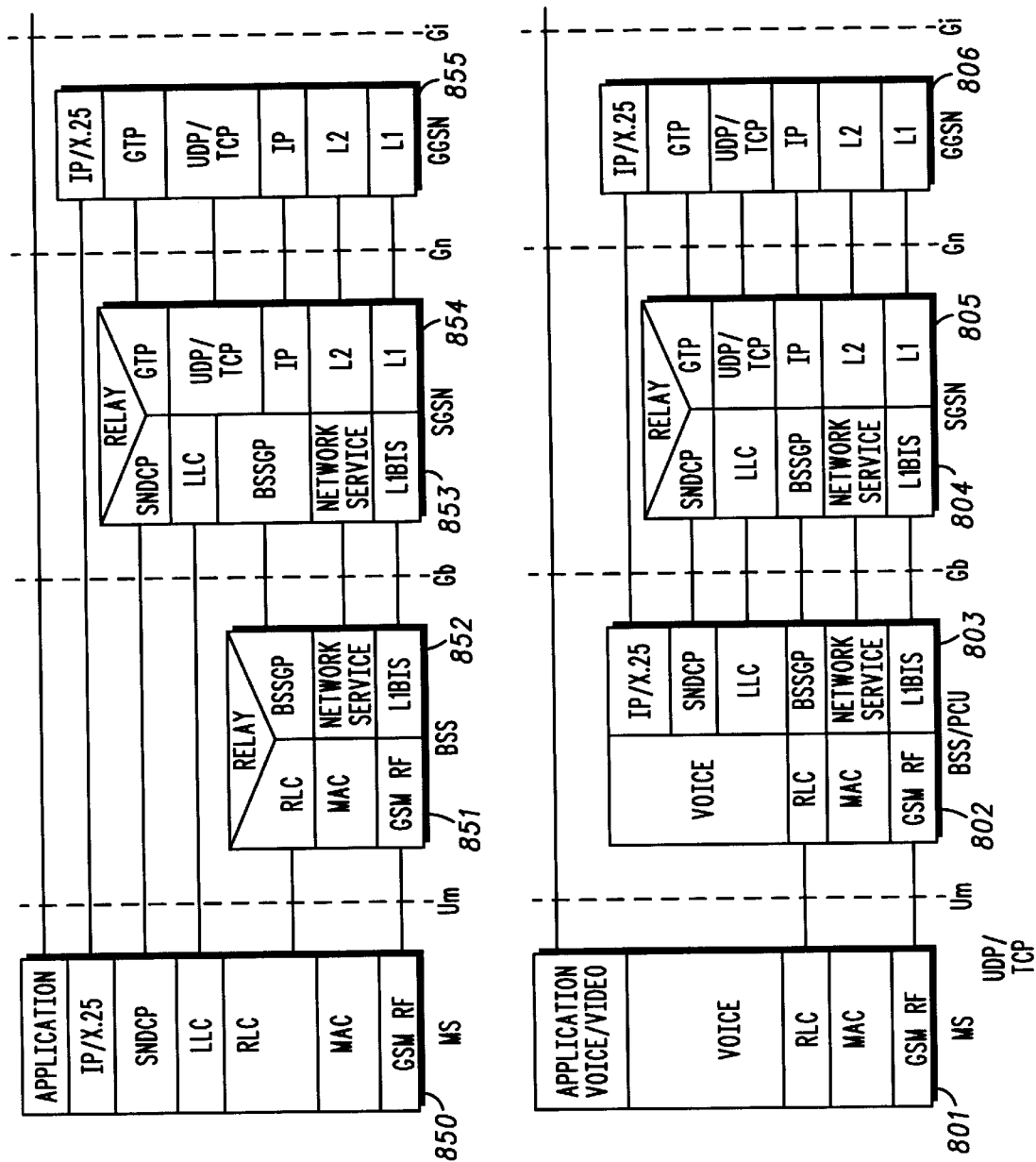

METHOD AND APPARATUS FOR VOICE PACKET COMMUNICATIONS

FIELD OF THE INVENTION

The present invention generally relates to communication systems, and more particularly to voice packet communication in the communication systems.

BACKGROUND OF THE INVENTION

Normally, a land-based data communication network transports information by using data packet switching. A wireless communication system, such as Global System for Mobile Communications (GSM), however, transports information in predefined or selected time slots over its wireless communication links. A GSM network transports data information by using circuit switching network. As a result, voice information is typically transferred in a circuit switched manner. A copy of GSM system specification and standards may be obtained by contacting European Telecommunications Standards Institute, 650 Rt. des Lucioles—Sophia Antipolis, Valbonne—FRANCE. A GSM communication system may provide general packet radio service (GPRS) along with traditional PSTN services according to the GSM standards. General packet radio services are provided via a data network operating based on data packet switching.

When voice information is transmitted in a wireless communication system, and the voice information is intended to be routed by data packet switching to reach a destination host, the voice information in the transmitter is treated like data packet information. As a result, a substantial number of overhead data bits are added to the voice information before its transmission. The amount of overhead data bits often times occupy most of the wireless communication bandwidth. Since the time slots of the wireless link have predefined and fixed duration and bandwidth, communication of voice information when treated like data information in the wireless communication system would occupy a larger bandwidth of the system capacity and a larger number of time slots than communication of the same amount of voice information when treated like voice information. Such a use of available system bandwidth is inefficient.

Therefore, there is a need for a method and apparatus for efficiently communicating voice information in a wireless communication system when the voice information is routed through a data network operating based on data packet switching.

BRIEF DESCRIPTION OF THE DRAWINGS

FIG. 8 depicts a functional description of protocol stacking at various connections in a communication system according to various aspects of the invention.

DETAILED DESCRIPTION OF THE PREFERRED EMBODIMENTS

According to various embodiments of the invention, in a wireless communication system providing communication of voice information between a mobile station (MS) and a host through a base station system (BSS), a method includes establishing a wireless link between the MS and BSS, channel coding the voice information in the MS according to a channel coding scheme to produce channel coded voice information, transmitting the channel coded voice information from the MS over the wireless link to be received by the BSS, channel decoding the channel coded voice information based on the channel coding scheme to produce decoded voice information in the BSS, adapting the decoded voice information to a packet voice information, and communicating the packet voice information to the host through a data network that operates based on data packet switching. Since the voice information is not appended with overhead data bits and is not treated like data information at the MS, the voice information does not carry the additional overhead data bits when transmitted over the wireless link. As a result, the bandwidth of the wireless link is used efficiently for communication of voice information. Moreover, fewer time slots in the wireless link are selected to communicate the voice information while the voice information reaches its destination host through a data network operating based on data packet switching.

Similarly, if communication of the voice information is generated from the host connected to the data network, the BSS channel codes the voice information according to a voice channel coding scheme, rather than using a data channel codec. The voice information format is adapted from a data packet switching format to a format suitable for coding in the channel codec. The channel coded voice information is transmitted to the MS via a wireless link. As such, the MS receives the voice information by decoding the voice information according to the coding scheme. IF the voice information is intended to be received by a data generating device, the decoded voice information may need to be adapted to a data packet switching format.

Although, through out this application, one or more communication paths have been described, there are other communication paths that the invention is similarly applicable. The examples and other descriptions in the disclosure do not limit the scope and applicability of the invention. The description provided in the application allows for one reasonably skilled in the art to understand and find other communication paths that may exist. The following describes in detail the communication path from the MS to a telephone subscriber or a host. The communication path from the telephone subscriber or the host to the MS is easily understandable by one reasonably skilled in the art.

Figure 1:
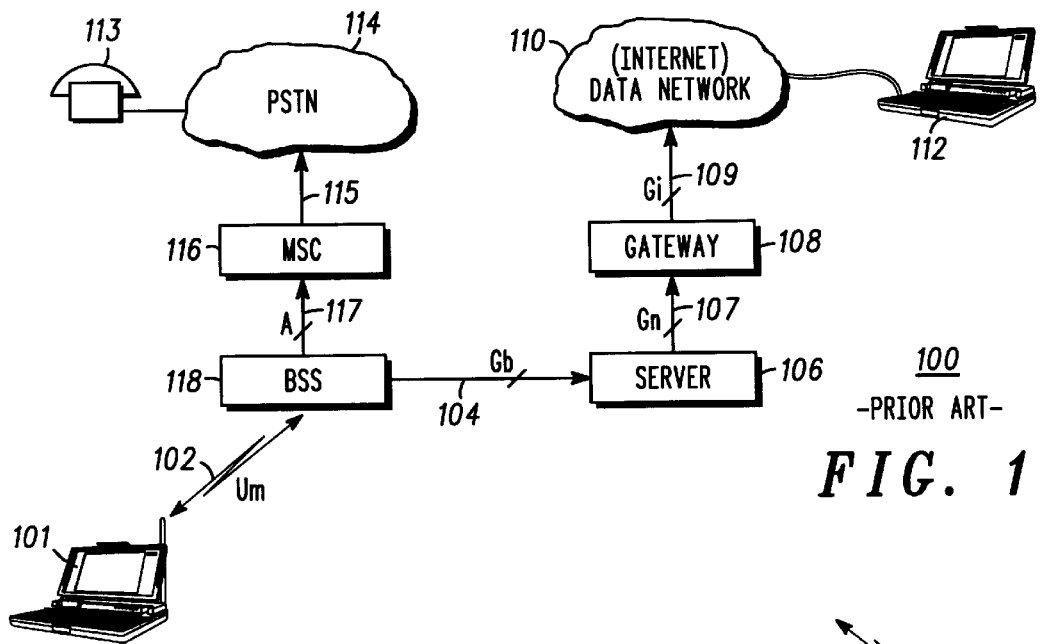
FIG. 1 depicts a general block diagram of a communication system according to prior art.

Referring to FIG. 1, a general block diagram of a communication system 100 is shown according to prior art. Communication system 100 provides general packet radio services (GPRS) along with the traditional PSTN services. Communication system 100 provides applications of communicating voice information to a host 112 and a subscriber 113. Host 112 is connected to a data packet switching network 110, and subscriber 113 connected to a public switching telephone network (PSTN) 114 operating based on circuit switching. The applications include communication of voice information over Internet Protocol (IP) via network 110.

A MS 101 and BSS 118 have a wireless communication link 102 to communicate voice information, among other types of information. To provide general packet radio service (GPRS) along with the traditional PSTN services according to GSM standards, BSS 118 has connections to PSTN 114 and data packet switching network 110. More information about GPRS is available by referring to GSM standards. BSS 118 communicates at a connection 104 to data packet switching network 110, and at connection 117 to PSTN 114 which is operating based on circuit switching. The voice information may be routed through PSTN 114 or data network 110. Data packet switching network 110 may be an internet which is a collection of ports connected through a web of network connections.

If the voice information is intended for host 112, according to prior art, the voice information is converted to data type information in MS 101 before its transmission from MS 101 via wireless communication link 102. The data conversion includes appending protocols data bits. The appended data bits facilitate transportation and identify the routing of the voice information in data packet switching network 110. Host 112 may be connected to data network 110 at any of its ports. For example, for application of transporting voice information over Internet Protocol (IP), the appended data bits to the voice information are according to IP. The voice information with its appended data bits according to IP is routed through data network 110 to reach its destination at host 112. If the voice information is intended for telephone subscriber 113 connected to PSTN 114, the voice information normally is transmitted from MS 101 without the additional overhead data bits.

MS 101 communicates the voice information to BSS 118 over wireless link 102 according to "Um" interface as defined in the GSM standards. BSS 118, then, communicates the voice information to a server 106 via connection 104 according to a "Gb" interface as defined by GSM standard. The communication via connection 104 is preferably in a data packet switching format. Server 106 and a gateway 108 and their interconnection 107 at "Gn" interface as defined by GSM specification facilitate the data packet switching communication between BSS 118 and data network 110. Gateway 108 communicates to network 110 via a connection 109 according to "Gi" interface as defined by GSM specification. Data network 110 transports the voice information to host 112.

If the voice information transmitted from MS 101 via link 102 is intended to be routed through PSTN 114 to reach a subscriber 113, BSS 118 through a connection 117 communicates the voice information to a mobile station controller (MSC) 116. Connection 117 is according to an "A" interface as defined in the GSM standards. MSC 116 transports the voice information over a circuit switched connection at connection 115 to PSTN 114. PSTN 114 is normally connected to telephone subscribers, such as subscriber 113. PSTN 114 operates based on circuit switching. The voice information accordingly is routed in PSTN 114 to reach subscriber 113.

Figure 2:
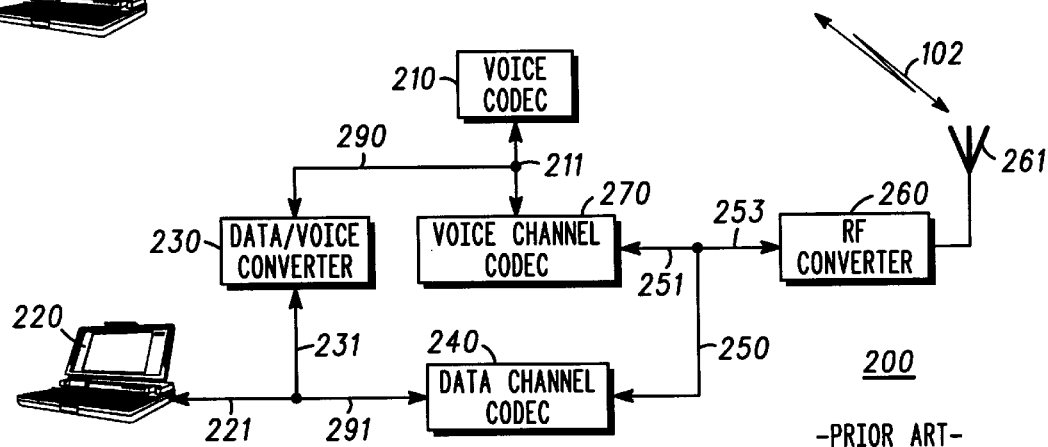
FIG. 2 depicts a general block diagram of a mobile station according to prior art.

Referring to FIG. 2, a general block diagram 200 of MS 101 according to prior art is shown. Voice codec 210 codes voice information that may be generated by a person's voice or artificially created to produce voice information 211. The voice coding in voice codec 210 is according to a voice coding scheme that is defined by the GSM standard. If voice information 211 is intended to be received by host 112, voice information 211 is routed via a connection 290 to a data and voice converter 230 for conversion of voice information 211 to data packets that are suitable for transmission to host 112 via data packet switching network 110. As a result, data and voice converter 230 appends voice information 211 with overhead data bits. Data and voice converter 230 produces data packets 231.

The voice information may also be generated by a data information generator 220, however, such voice information is already converted to a format suitable for transportation via data packet switching network 110. Data information generator 220, such as a computer, produces the information in data packet 221. Data packets 231 and 221 are routed to data channel codec 240 via connection 291. Data channel codec 240 channel codes data packets 231 or 221 to produces a channel coded information 250. Channel coded information 250 passes to a radio frequency (RF) converter 260 via a connection 253. RF converter 260 converts channel coded information 250 to a suitable format for a radio frequency transmission from an antenna 261 via wireless link 102. Wireless link 102 is according to "Um" interface.

Similarly, if voice information 211 is intended to be received by subscriber 113, voice channel codec 270 channel codes voice information 211 to produce a voice channel coded information 251. Voice channel coded information 251 passes to RF converter 260 via connection 253. RF converter 260 converts voice channel coded information 251 to a suitable format for radio frequency transmission from antenna 261 via wireless link 102. Wireless link 102 is according to "Um" interface.

Figure 3:
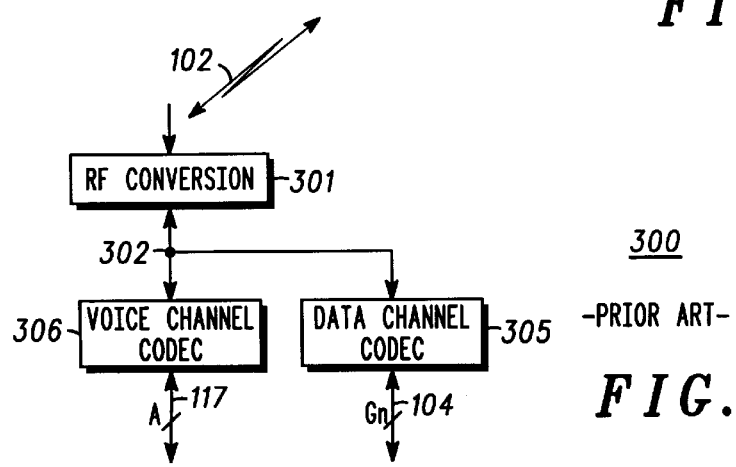
FIG. 3 depicts a general block diagram of a base station system according to prior art.

Referring to FIG. 3, a general block diagram 300 of BSS 118 is shown according to prior art. An RF converter 301 converts the RF signal received via wireless link 102 to a signal 302 in a suitable format for reception by a voice channel codec 306 or a data channel codec 305. Signal 302 may be in digital or analog based band format. If the information, including voice information, carried by wireless link 102 is coded in data channel codec 240, signal 302 is routed to a data channel codec 305. Data channel codec 305 after decoding signal 302 produces the decoded information at connection 104 according to "Gb" interface. Data channel codec 305 produces, preferably, the decoded information in voice data packets at connection 104 if the transmitted information is voice information.

If the voice information carried by wireless link 102 is coded in voice channel codec 270, signal 302 is routed to voice channel codec 306. Voice channel codec 306 decodes the voice information, and outputs the decoded voice information at connection 117 according to "A" interface.

Figure 4:
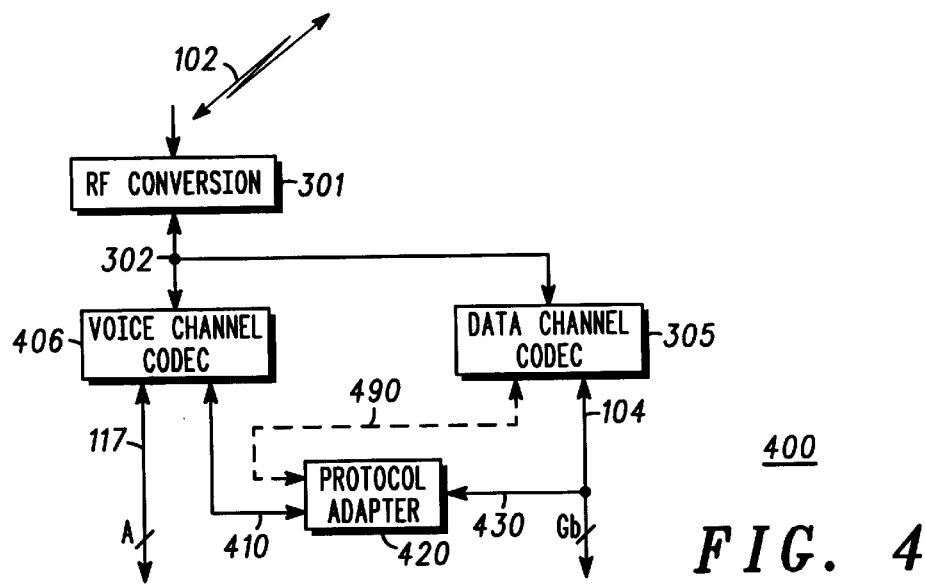
FIG. 4 depicts a block diagram of a base station system according to various embodiments of the invention.

Referring to FIG. 4, a block diagram 400 of a BSS according to various embodiments of the invention is shown. If the information carried by wireless link 102 is coded by a data channel codec, such as data channel codec 240, the signal 302 is routed to data channel codec 305. Data channel codec 305 produces decoded data information at connection 104 according to "Gb" interface. Communication via connection 104 preferably is based on data packet switching. If the information carried by wireless link 102 is coded by a voice channel codec, such as voice channel codec 270, signal 302 is routed to a voice channel codec 406. Voice Channel codec 406 outputs the decoded voice information at connection 117 according to "A" interface. If the voice information is to be routed through data packet switching network 110, voice channel codec 406 decodes signal 302 and outputs a signal 410. Signal 410 carries the decoded voice information to a protocol adapter 420. Protocol adapter 420 adapts the decoded voice information received by signal 410 to a data packet switching format and accordingly outputs a signal 430. Signal 430 carries the voice information in a suitable data packet switching format for transportation over data network 110 at connection 104 according to "Gb" interface. Since the protocol adapter 420 adapts the voice information to a format suitable for data packet switching, MS 101, therefore, is not required to code the voice information by a data channel codec. The voice information is transmitted from MS 101 and routed through a data packet switching network 110 without occupying a substantial portion of the communication bandwidth of wireless link 102.

Protocol adapter 420 may also be used to exchange voice information with data channel codec 305. In such a case, a connection 490 facilitates adapting voice information received or transmitted from data channel codec 305. The adapted voice information is channel coded or decoded by data channel codec 305. The adapted voice information does not have the usual over head data bits even though the voice information is being coded by data channel codec 305. As a result, the over the air communication bandwidth is preserved for communication of voice information.

As a result, a GSM system that is providing general packet radio services (GPRS) along with traditional PSTN services does not require its mobile stations to transmit data channel coded voice information when the voice information is intended for a host connected to a data packet switching network. The voice information is routed through data packet switching network 110 without appending the voice information with overhead data bits before being transmitted from the mobile stations. The communication bandwidth of wireless link 102, therefore, is used efficiently.

Advantages of the invention includes the capacity of the communication system to use a predefined voice channel coding scheme that is for voice channel coding of the voice information when the voice information is intended to be routed over data packet switching network 110. As a result, MS 101 may incorporate a voice channel codec that has a coding scheme optimized for channel coding of voice information in addition to other GSM standard voice channel codec.

Referring to FIG. 4, if signal 302 carries voice information that is coded according to a predefined coding scheme, voice channel codec 406 decodes signal 302 according to the predefined coding scheme. A selector selects the coding scheme, and the voice channel codec 406 produces the decoded voice information according to the selected coding scheme which may be either GSM standard voice coding scheme or the predefined coding scheme. Such a selector is not shown because it may be incorporated in many different ways in block diagram 400. However, the most suitable place for such a selector is in voice channel codec 406. The predefined channel coding scheme is optimized for transporting voice information over data network 110.

Figure 5:
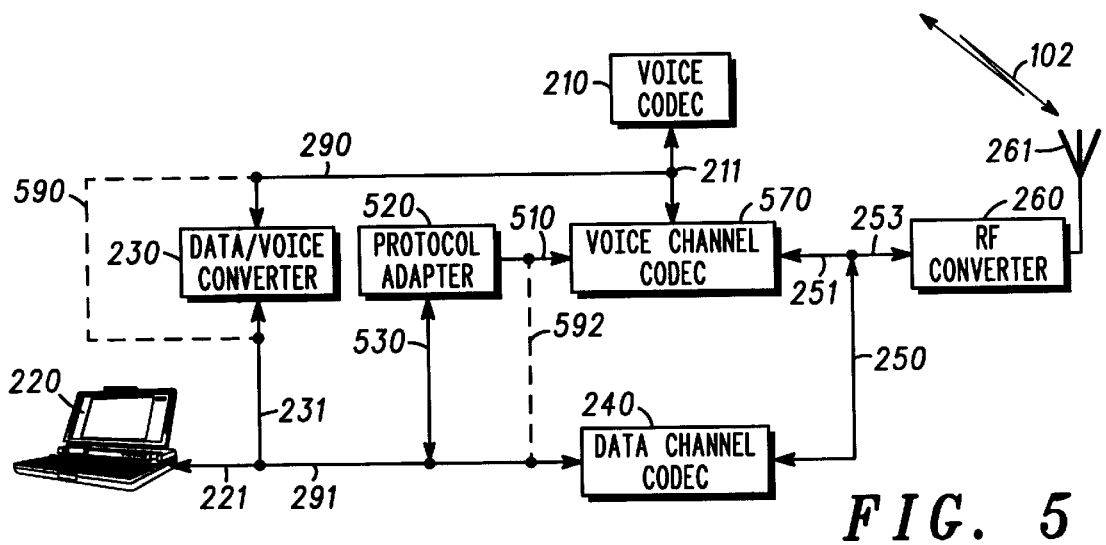
FIG. 5 depicts a block diagram of a mobile station according to various embodiments of the invention.

Referring to FIG. 5, a block diagram 500 of MS 101 is shown according to various embodiments of the invention. Voice information 211 is routed to voice channel codec 570. Voice channel codec 570 channel codes voice information 211 according to the GSM standard voice channel coding scheme or a predefined coding scheme that is optimized for transporting voice information 211 in a packetized format over the air interface, such as interface "Um". A selector, not shown, selects the appropriate coding scheme. The selector is not shown because it may be implemented in many different ways. Preferably, such a selector is internal to the inter-working operation of voice channel codec 570. If voice information 211 is intended to be received by subscriber 113 connected to PSTN 114, standard GSM voice coding is selected. If voice information 211 is intended to be received by host 112 connected to data packet switching network 110, the predefined coding scheme is selected. The predefined channel coding scheme is optimized for efficient channel coding of packetized voice information for over the air interface communication. As a result, the bandwidth of wireless link 102 is preserved for communication of voice information.

The coding scheme in voice codec 210 is paired with the predefined channel coding scheme to provide the most efficient method of communicating the packetized voice information over the air interface. In a case where the predefined coding scheme is not paired with the voice coding scheme in voice codec 210, voice information 211 may be routed directly to data channel codec 240 while bypassing data and voice converter 230 via connection 590. Although data channel coding voice information 211 without performing the data and voice conversion in data and voice converter 230 may produce slightly less than desirable voice quality, such a method is efficient for communicating the packetized voice information over the air interface. The degradation in voice quality in such a case may be acceptable in certain circumstances.

In case data information generator 220 is producing data packet 221 that includes voice information, such as computer generated voice information, data packet 221 may be routed to a protocol adapter 520 for adapting data packet 221 to a format suitable for voice channel coding by voice channel coder 570. Connections 530 and 510 facilitate such routing. A selector, not shown, selects whether data packets 221 received at connection 291 is to be coded by data channel codec 240 or 570. If data packets 221 are carrying voice type information, voice channel codec 570 preferably codes data packets 221. Moreover, when data packets 221 are carrying voice information and such voice information is intended to be routed through data packet switching network 110, voice channel codec 570 preferably codes data packets 221. Data packets 221 are adapted by protocol adapter 520 to a suitable format for voice coding in voice channel codec 570.

In case the converted data packets 211 at connection 510 do not have a channel coding scheme that is paired with the voice coding scheme used in data information generator 220, the converted data packets 211 at connection 510 are routed via a connection 592 to data channel codec 240 for channel coding. Although data channel coding the converted data packets 211 at connection 510 may produce slightly less than desirable voice quality, such a method is efficient for communicating the packetized voice information over the air interface. The degradation in voice quality in such a case may be acceptable in certain circumstances.

If the voice information in data packet 221 is intended to be received by subscriber 113 connected to PSTN 114, standard GSM voice coding is selected in voice channel codec 570. If voice information in data packet 221 is intended to be received by host 112 connected to data packets switching network 110, the predefined coding scheme is selected. The predefined coding scheme provides better voice quality than the data channel coding scheme for the same amount of overhead data bits. The amount of overhead data bits in the predefined coding scheme may be substantially less than the amount of overhead data bits in the data channel coding scheme while maintaining the same voice quality. As a result, the bandwidth of wireless link 102 is preserved for communication of voice information.

Figure 6:
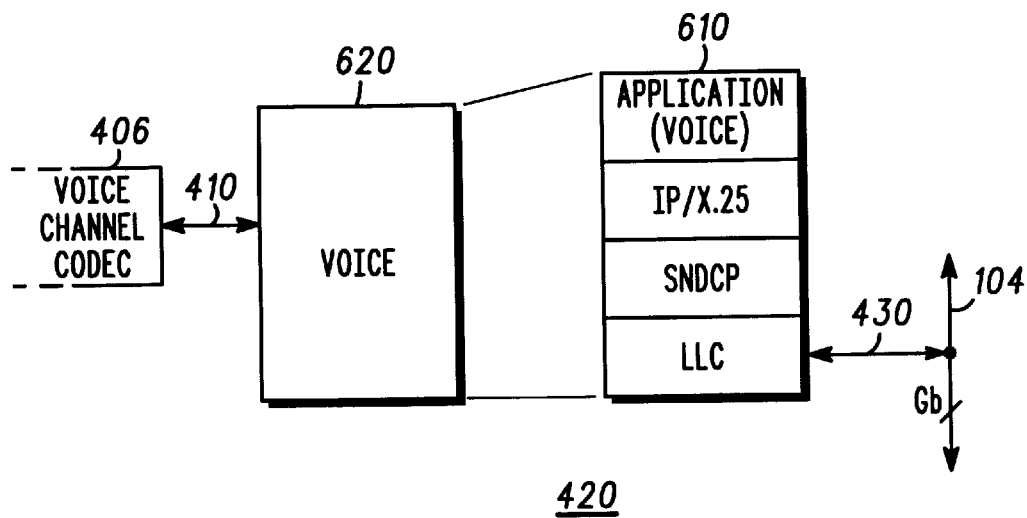
FIG. 6 depicts a functional description of a protocol adapter used in a base station system according to various aspects of the invention.

Referring to FIG. 6, a functional description of protocol adapter 420 is shown. By signal 430, at connection 104, the data packets are received and transmitted according to protocol stacking 610. Such protocol stacking includes internet protocol (IP). A protocol stacking 620 also is observed by signal 410 that is received or transmitted from voice channel codec 406. For more information regarding the protocol stacking refer to GSM standard. Protocol stacking 620 is suitable for communication of voice information with codec 406, and protocol stacking 610 is suitable for data packet switching network 110. Protocol adapter 420 adapts the protocol carried by signal 430 to signal 410, and adapts the protocol carried by signal 410 to signal 430.

Figure 7:
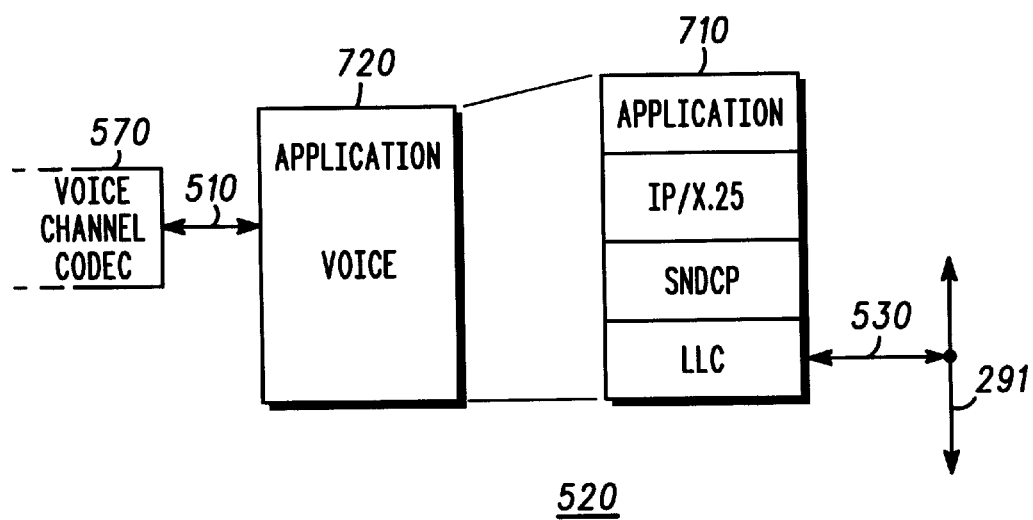
FIG. 7 depicts a functional description of a protocol adapter used in a mobile station according to various aspects of the invention.

Referring to FIG. 7, a functional description of protocol adapter 520 is shown. The data packets received or transmitted by signal 530 are adapted to protocol stacking 710. Such protocol stacking includes internet protocol (IP). A protocol stacking 720 is accordingly observed for communication of voice information by signal 510. For more information regarding the protocol stacking refer to GSM standard. Protocol stacking 720 is suitable for communication of voice information to voice channel codec 570, and protocol stacking 710 is suitable for data packet communication at connection 291 with data information generator 220. Protocol adapter 520 adapts the protocol of signal 530 to signal 510, and adapts the protocol of signal 530 to signal 510.

Referring to FIG. 8, a functional description of protocol stacking at various connections in communication system 100 according to various aspects of the invention is shown. The communication protocol stackings 850–855 at various interfaces in communication system 100 are shown for a case when the information communicated between the network and the mobile station is coded according to a data channel coding scheme. The over the air interface at the interface "Um" includes many data bits associated with the protocol stackings at 850 and 851. According to an aspect of the invention, the protocol stackings at various interfaces in the communication system 100 is according to a protocol stackings 801–806. A substantial number of overhead data bits associated with the protocol stacking has been eliminated.

According to an aspect of the invention, the channel coded voice information is transmitted from MS 101 with protocol stacking 801 according to "Um" interface standard. After radio frequency conversion at RF converter 301, and decoding at voice channel codec 406, signal 410 has a protocol stacking according to protocol stacking 802. Protocol adapter 420 adapts the protocol stacking 802 to a protocol stacking 803 according to "Gb" interface. Protocol stockings 804, 805, and 806 facilitate transportation of the voice information through network 110 to host 112. According to the invention, since the communication at "Um" interface is accomplished without transmission of excess protocol overhead data bits, the communication bandwidth is used efficiently while transporting voice information over a data packet switching network 110, like voice over IP.

For communication of voice information generated from host 112, the voice information in data packet switching format at connection 104 is adapted by protocol adapter 420 to a format suitable for voice channel coding in voice channel codec 406. Voice channel codec 406 codes the received voice information according to a selected voice channel coding scheme. The selected coding scheme may be a predefined coding scheme optimized for communication of voice information over a data packet switching network, or a standard GSM voice channel coding scheme. The coded voice information is up-converted to a suitable radio frequency at RF conversion 301 and transmitted via wireless link 102. The voice information accordingly is without any appended protocol bits when transmitted via wireless link 102. As such, the communication bandwidth of wireless link 102 is preserved.

The RF signal carried via wireless link 102 is down-converted in RF converter 260. The down converted signal is routed either to voice channel codec 570 or data channel codec 240 depending on the selected channel coding at the transmitting source. If the voice information is voice channel coded in the transmitting source and is intended to be routed to data information generator 220, after the decoding operation, protocol adapter 520 adapts the decoded voice information at connection 510 to a suitable format at connection 530 for reception by data information generator 220. Otherwise, the voice information is decoded in voice channel codec 570 and routed to voice codec 210.

According to an aspect of the invention, the invention includes an step of enabling protocol adapter 420 to perform its adapting format of the decoded voice information. Such enabling is directed by BSS 118. Once protocol adapter 420 is enabled, MS 101 does need to use data channel codec 240 for communication of voice information. BSS 118 transmits a message to MS 101 via wireless link 102 directing MS 101 to switch from data channel codec 240 to voice channel codec 570. MS 101, subsequently, switches the channel coding of the voice information to voice channel codec 570.

In alternative, the enabling of protocol adapter 420 may be directed by MS 101 via wireless link 102. The MS 101 transmits a message to BSS 118 directing BSS 118 to enable protocol adapter 420. Once protocol adapter 420 is enabled and is ready to begin the adapting format of decoded voice information 410, MS 101 no longer need to use the data channel codec 240 for communication of voice information. MS 101 subsequently switches from data channel codec 240 to voice channel codec 570.

Similarly, protocol adapter 520 may be enabled such that voice channel codec 570 is used for coding voice information sourced at data generating device 220. The enabling may be directed by BSS 118 via wireless link 102. BSS 118 transmits a message to MS 101 directing MS 101 to switch from data channel codec 240 to the voice channel codec 570. Alternatively, the enabling may be directed by MS 101 without any apparent change in BSS 118. The BSS 118 receives the voice information as if it was generated from voice codec 210.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. In a communication system providing communication of voice information between a mobile station (MS) and a host through a base station system (BSS) and a data packet switching network, a method comprising the steps of:

establishing a wireless link between said MS and BSS;

channel coding said voice information according to a channel coding scheme to produce channel coded voice information;

transmitting said channel coded voice information over said wireless link;

receiving said channel coded voice information over said wireless link;

channel decoding said channel coded voice information based on said channel coding scheme to produce decoded voice information; and adapting format of said decoded voice information to a data packet switching format suitable for transportation of said decoded voice information over said data packet switching network or format of said decoded voice information from data packet switching format to a format suitable for said channel coding, wherein said adapting format of said decoded voice information step includes adding protocol data bits to said decoded voice information.

2. The method as recited in claim 1 further comprising the step of selecting said coding scheme from a plurality of coding schemes.

3. The method as recited in claim 2 wherein said plurality of coding schemes includes a predefined voice channel coding scheme paired with said voice information.

4. The method as recited in claim 2 wherein said plurality of coding schemes includes a data channel coding scheme.

5. The method as recited in claim 1 further comprising the steps of:

exchanging data information from a data information generator device; and adapting format of said data information according to a voice information format to produce said voice information.

6. The method as recited in claim 5 wherein said adapting format of said data information step includes one of removing and adding protocol stacking.

7. The method as recited in claim 5 wherein said voice information format is suitable for channel coding said voice information according to said channel coding scheme.

8. The method as recited in claim 5 wherein said adapting format of said data information step includes removing protocol data bits from said data information to produce said voice information.

9. The method as recited in claim 5 wherein said adapting format of said data information step includes adding protocol data bits from said data information to produce said voice information.

10. The method as recited in claim 1 wherein said adapting format of said decoded voice information step includes adding protocol data bits to said decoded voice information.

11. The method as recited in claim 1 wherein said adapting format of said decoded voice information step includes one of removing and adding protocol stacking.

12. The method as recited in claim 11 wherein said protocol stacking is according to an internet protocol stacking.

13. The method as recited in claim 1 further comprising the step of enabling said adapting format of said decoded voice information step.

14. The method as recited in claim 13 wherein said enabling is directed by said BSS.

15. The method as recited in claim 14 further comprising the step of transmitting a message from said BSS to said MS via said wireless link directing said MS to switch from exchanging voice information in data mode to a voice mode.

16. The method as recited in claim 15 further comprising the step of switching said data channel coding of said voice information in said MS to said voice channel coding of said voice information according to said channel coding scheme.

17. The method as recited in claim 15 further comprising the step of directing said MS to switch from exchanging data information in voice mode to a data mode.

18. The method as recited in claim 13 wherein said enabling is directed by said MS via said wireless link.

19. The method as recited in claim 18 further comprising the step of transmitting a message from said MS to said BSS via said wireless link directing said BSS to enable said adapting format of said decoded voice information step.

20. The method as recited in claim 5 further comprising the step of enabling said adapting format of said data information step.

21. The method as recited in claim 20 wherein said enabling is directed by said BSS via said wireless link.

22. The method as recited in claim 20 wherein said enabling is directed by said MS.

23. In a communication system providing communication of voice information between a mobile station (MS) and a host through a base station system (BSS) and a data packet switching network connected to said host, an apparatus comprising:

means, in said BSS, for converting a radio frequency link signal transmitted from said MS to a channel coded information signal;

a voice channel codec means, coupled to said means for converting said radio frequency link signal, for decoding voice information of said channel coded information signal to produce a decoded voice information signal, wherein said means for voice channel coding includes means for selecting a voice channel coding scheme from a plurality of channel coding schemes;

a data channel codec means, coupled to said means for converting said radio frequency link signal, for decoding data information of said channel coded information signal to produce a decoded data information signal;

means for adapting protocol format of said decoded voice information signal according to a data packet switching format to produce a data packet switching signal carrying voice information;

means for coupling said data packet switching signal carrying voice information and decoded data information signal to said data packet switching network.

24. In a communication system providing communication of voice information between a mobile station (MS) and a host through a base station system (BSS) and a data packet switching network connected to said host, an apparatus comprising:

a voice codec means in said MS producing a voice information signal;

means for data and voice converter coupled to said voice codec means to convert said voice information signal to a first data information signal;

means for generating a second data information signal;

means for data channel coding said first and second data information signals;

means for voice channel coding said voice information signal, wherein said means for voice channel coding includes means for selecting a voice channel coding scheme from a plurality of channel coding schemes;

means for a protocol adapter coupled to said means for generating said second data information signal to adapt said second data information signal to a voice channel format suitable for voice channel coding by said means for voice channel coding;

means for radio frequency conversion of channel coded signals produced by said means for voice channel coding and means for data channel coding to produce a radio frequency link signal to be transmitted to said BSS.

* * * * *